(12) United States Patent
Kawakami

(10) Patent No.: US 9,932,091 B2
(45) Date of Patent: Apr. 3, 2018

(54) BICYCLE OPERATING DEVICE

(71) Applicant: Shimano Inc., Sakai, Osaka (JP)

(72) Inventor: Tatsuya Kawakami, Osaka (JP)

(73) Assignee: Shimano Inc., Osaka (JP)

( * ) Notice: Subject to any disclaimer, the term of this patent is extended or adjusted under 35 U.S.C. 154(b) by 91 days.

(21) Appl. No.: 15/081,062

(22) Filed: Mar. 25, 2016

(65) Prior Publication Data

US 2017/0274964 A1 Sep. 28, 2017

(51) Int. Cl.
*F16C 1/10* (2006.01)
*B62M 25/04* (2006.01)

(52) U.S. Cl.
CPC .................................. *B62M 25/04* (2013.01)

(58) Field of Classification Search
CPC ............................. B62M 25/04; B62M 25/02
See application file for complete search history.

(56) References Cited

U.S. PATENT DOCUMENTS

| | | | |
|---|---|---|---|
| 5,009,629 A * | 4/1991 | Tagawa | B62M 25/04 280/238 |
| 5,307,706 A * | 5/1994 | Nagano | B62M 25/04 74/489 |
| 5,787,757 A * | 8/1998 | Ozaki | B62K 23/04 74/473.13 |
| 7,628,095 B2 | 12/2009 | Funai | |

FOREIGN PATENT DOCUMENTS

| | | |
|---|---|---|
| EP | 1792824 B1 | 8/2008 |
| JP | 4078369 B2 | 4/2008 |

* cited by examiner

*Primary Examiner* — Vicky A Johnson

(57) ABSTRACT

A bicycle operating device basically includes an operating member and a click mechanism. The click mechanism includes an input part, an output part and an intermediate part. The intermediate part is movable between the input and output parts to transmit movement from the input part to the output part in accordance with movement of the operating member. The intermediate part contacts the input part at a first contact point, and contacts the output part at a second contact point. The intermediate part and the output part define a first angle that decreases as the operating member moves from the first position toward the second position. The first angle has an apex at the second contact point, a first leg extending from the second contact point to a center of the pivot of the output part and a second leg extending from the second contact point to the first contact point.

19 Claims, 13 Drawing Sheets

BICYCLE OPERATING DEVICE

BACKGROUND

Field of the Invention

This invention generally relates to a bicycle operating device. More specifically, the present invention relates to a bicycle operating device having a click mechanism to indicate to a rider that the bicycle operating device has been operated to a predetermined position.

Background Information

Bicycles are often provided with one or more bicycle components that can be operated and/or adjusted by a rider while riding. Examples of some these bicycle components include a gear changing device (e.g., a derailleur or an internally geared hub), a suspension and a seatpost. A bicycle operating device is usually provided on a bicycle (e.g., on a bicycle handlebar) for a rider to operate and/or adjust these bicycle components. Sometimes these bicycle operating devices are provided with an indicating device such as a click mechanism to indicate to the rider that the bicycle operating device has been operated to a predetermined position.

SUMMARY

Generally, the present disclosure is directed to various features of a bicycle operating device having a click mechanism to indicate to a rider that the bicycle operating device has been operated to a predetermined position.

In some conventional bicycle shifters, a clicking feeling of a release lever being operated to a predetermined position is generated by increasing a biasing force of a positioning pawl. However, the operating force of the releasing lever can be undesirably increased due to the increase in a required operating force needed to disengage the positioning pawl from a ratchet tooth from increasing the biasing force of a positioning pawl.

One aspect is to provide a bicycle operating device having a bicycle operating device comprises a click mechanism that provides a clicking feeling while minimizing an increase in a required operating force of the bicycle operating device.

In view of the state of the known technology and in accordance with a first aspect of the present disclosure, a bicycle operating device is provided that basically comprises an operating member and a click mechanism. The operating member is movably arranged between a first position and a second position. The click mechanism includes an input part, an output part and an intermediate part. The input part is pivotally arranged in accordance with an operation of the operating member. The output part is pivotally arranged with respect to the input part in accordance with the operation of the operating member. The intermediate part is movably arranged between the input and output parts to transmit movement from the input part to the output part. The intermediate part is configured to contact the input part at a first contact point in a state where the operating member is in the first position. The intermediate part is configured to contact the output part at a second contact point in the state where the operating member is in the first position. The intermediate part and the output part define a first angle that decreases as the operating member moves from the first position toward the second position. The first angle has an apex at the second contact point, a first leg extending from the second contact point to a center of the pivot of the output part and a second leg extending from the second contact point to the first contact point. The first angle is less than or equal to 180 degree in a state where the operating member is in the first position.

In accordance with a second aspect of the present invention, the bicycle operating device according to the first aspect is configured so that the intermediate part is movably arranged with respect to the input part and the output part to define a second angle that decreases as the operating member moves from the first position toward the second position. The second angle has an apex at the first contact point, the second leg and a third leg extending from the first contact point to a center of the pivot of the input part. The second angle is less than or equal to 180 degree in a state where the operating member is in the first position.

In accordance with a third aspect of the present invention, the bicycle operating device according to the first aspect is configured so that the input part includes a sliding surface. The intermediate part contacts the sliding surface and slides along the sliding surface as the operating member moves from a rest position toward the first position, the first position being arranged between the rest position and the second position.

In accordance with a fourth aspect of the present invention, the bicycle operating device according to the third aspect is configured so that the input part includes an abutment surface. The intermediate part contacts the abutment surface after the intermediate part slides along the sliding surface during movement of the operating member from the rest position toward the first position, and the intermediate part pivoting on the abutment surface as the operating member moves from the first position toward the second position.

In accordance with a fifth aspect of the present invention, the bicycle operating device according to the fourth aspect is configured so that the output part includes a first curved recessed surface, and the intermediate part includes a first curved protrusion. The first curved protrusion contacts the first curved recessed surface while the intermediate part slides along the sliding surface during movement of the operating member from the rest position to the first position.

In accordance with a sixth aspect of the present invention, the bicycle operating device according to the fifth aspect is configured so that the output part includes a second curved recessed surface, and the intermediate part includes a second curved protrusion. The second curved protrusion contacts the second curved recessed surface after the intermediate part pivots on the abutment surface as the operating member moves from the first position toward the second position.

In accordance with a seventh aspect of the present invention, the bicycle operating device according to the first aspect further comprises a base member movably supporting the operating member and the click mechanism. The intermediate part is pivotally disposed about a first pivot axis as the operating member moves from the first position toward the second position, and the first pivot axis moves relative to the base member as the operating member moves from the first position toward the second position.

In accordance with an eighth aspect of the present invention, the bicycle operating device according to the seventh aspect is configured so that the output part is pivotally disposed about a second pivot axis as the operating member moves from the first position toward the second position, and the first pivot axis rotates about the second pivot axis as the operating member moves from the first position toward the second position.

In accordance with a ninth aspect of the present invention, the bicycle operating device according to the first aspect further comprises a wire take-up member movably arranged in accordance with the operation of the operating member.

In accordance with a tenth aspect of the present invention, the bicycle operating device according to the ninth aspect further comprises a positioning ratchet coupled to the wire take-up member, and a positioning pawl movably arranged between a holding position and a non-holding position.

In accordance with an eleventh aspect of the present invention, the bicycle operating device according to the tenth aspect is configured so that the output part moves the positioning pawl between the holding position and the non-holding position in accordance with the operation of the operating member from the first position toward the second position.

In accordance with a twelfth aspect of the present invention, the bicycle operating device according to the eleventh aspect is configured so that the input part includes a sliding surface. The intermediate part contacts the sliding surface and slides along the sliding surface as the operating member moves from a rest position toward the first position. The first position is arranged between the rest position and the second position.

In accordance with a thirteenth aspect of the present invention, the bicycle operating device according to the eleventh aspect is configured so that the output part moves the positioning pawl from the holding position to the non-holding position as the intermediate part slides during movement of the operating member from the rest position toward the first position.

In accordance with a fourteenth aspect of the present invention, the bicycle operating device according to the twelfth aspect is configured so that the input part includes an abutment surface. The intermediate part contacts the abutment surface after the intermediate part slides along the sliding surface during movement of the operating member from the rest position toward the first position, and the intermediate part pivots on the abutment surface as the operating member moves from the first position toward the second position.

In accordance with a fifteenth aspect of the present invention, the bicycle operating device according to the fourteenth aspect is configured so that the output part moves the positioning pawl from the holding position to the non-holding position as the intermediate part pivots on the abutment surface during movement of the operating member from the first position toward the second position.

In accordance with a sixteenth aspect of the present invention, the bicycle operating device according to the fourteenth aspect is configured so that the output part includes a first curved recessed surface, and the intermediate part includes a first curved protrusion, the first curved protrusion contacting the first curved recessed surface while the intermediate part slides along the sliding surface during movement of the operating member from the rest position to the first position.

In accordance with a seventeenth aspect of the present invention, the bicycle operating device according to the sixteenth aspect is configured so that the output part includes a second curved recessed surface, and the intermediate part includes a second curved protrusion, the second curved protrusion contacting the second curved recessed surface after the intermediate part pivots on the abutment surface as the operating member moves from the first position toward the second position.

In accordance with an eighteenth aspect of the present invention, the bicycle operating device according to the seventeenth aspect is configured so that the output part moves the positioning pawl from the holding position to the non-holding position as the intermediate part pivots on the abutment surface from a position in which only the first curved protrusion contacts the first curved recessed surface to a position in which the first and second curved protrusions contact the first and second curved recessed surfaces, respectively.

In accordance with a nineteenth aspect of the present invention, the bicycle operating device according to the tenth aspect is configured so that the operating member is a release lever that moves the wire take-up member in a releasing direction in accordance with the operation of the release lever from the first position toward the second position.

Also other objects, features, aspects and advantages of the disclosed bicycle operating device will become apparent to those skilled in the art from the following detailed description, which, taken in conjunction with the annexed drawings, discloses one illustrative embodiment of the bicycle operating device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
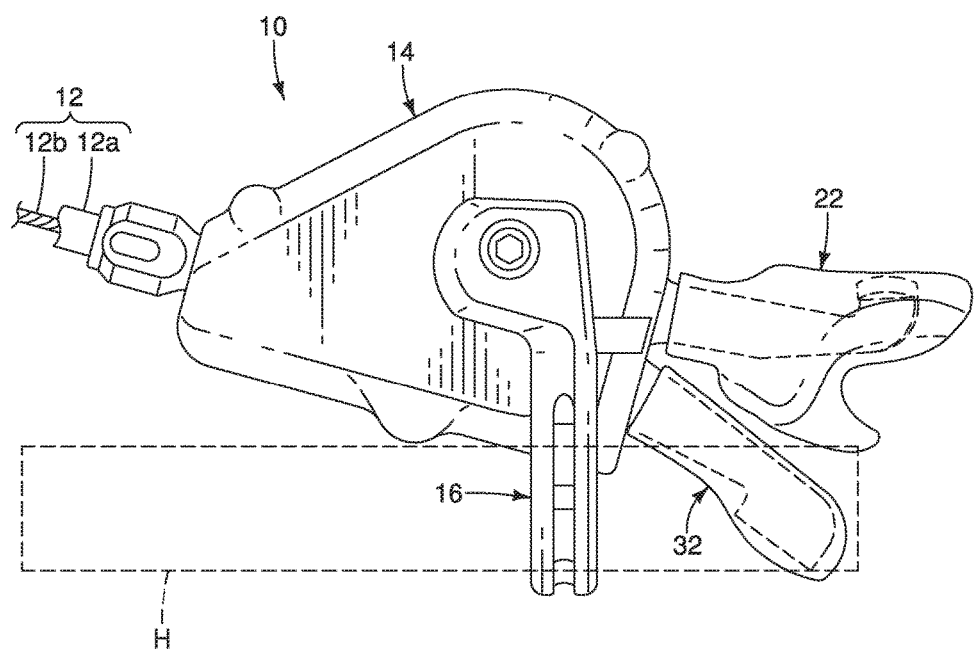
FIG. 1 is a top plan view of a right end of a bicycle handlebar that is equipped with a bicycle operating device in accordance with one illustrated embodiment.

Referring initially to FIG. 1, a bicycle operating device 10 is illustrated in accordance with one illustrated embodiment. Here, the bicycle operating device 10 is configured to be mounted to a right side of a handlebar H so as to be operated by rider's right hand. In the first illustrated embodiment, the bicycle operating device 10 is configured to be operatively coupled to a bicycle component (not shown) via a control cable 12. In the illustrated embodiment, the bicycle operating device 10 is configured as a shifter for controlling a gear position of a rear gear changing device such as a derailleur or an internally geared hub. However, the bicycle operating device 10 can be configured as a bicycle control device for operating other types of bicycle components (e.g., suspension devices) as needed and/or desired.

Also, the bicycle operating device 10 can be modified to be mounted on the left side of a handlebar H. Thus, two bicycle operating devices could be provided on opposite ends of the handlebar H. In such a case, the one of the bicycle operating devices would be used to operate a first bicycle component and the other of the bicycle operating devices would be used to operate a second bicycle component. When the bicycle operating devices are configured as gear shifters, the two bicycle operating devices could be essentially identical in operation, except that they would be mirror images of each other, and they may have a different number of actuation (shift) positions.

Preferably, as seen in FIG. 1, the control cable 12 is a conventional bicycle operating cable that has an outer case 12a covering an inner wire 12b. In other words, the control cable 12 is a Bowden type cable in which the inner wire 12b is slidably received within the outer case 12a. The bicycle operating device 10 operates the bicycle component (not shown) by selectively pulling and releasing the inner wire 12b.

Figure 2:
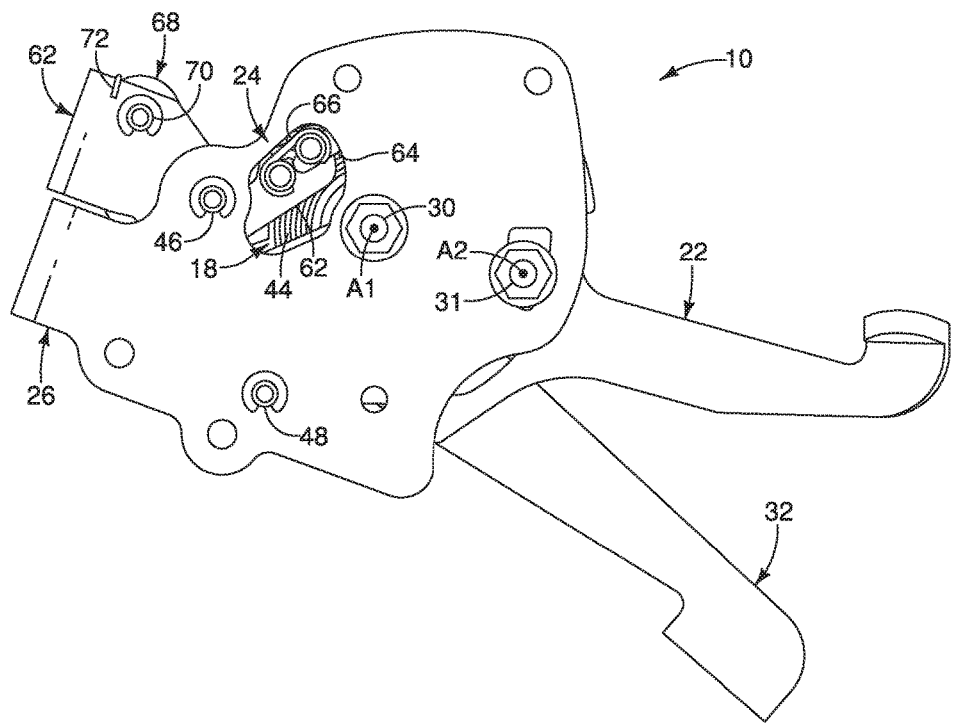
FIG. 2 is an enlarged top plan view of the bicycle operating device illustrated in FIG. 1 with the housing removed to reveal internal parts of the bicycle operating device.
Figure 3:
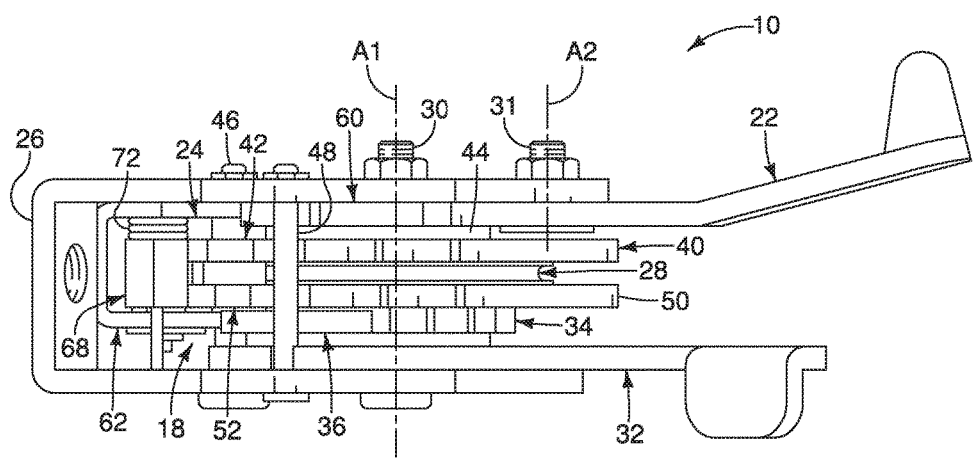
FIG. 3 is a side elevational view of the internal parts of the bicycle operating device illustrated in FIG. 2.

As seen in FIG. 1, the bicycle operating device 10 comprises a housing 14 and a handlebar clamp 16. As seen in FIGS. 2 and 3, the bicycle operating device 10 comprises a cable position maintaining mechanism 18. The housing 14 (FIG. 1) covers the cable position maintaining mechanism 18 (FIG. 2) of the bicycle operating device 10. Here, for example, the housing 14 has a two-piece construction (i.e., upper and lower housing parts) that is fastened together by a plurality of screws (not shown). The housing parts are hard rigid members constructed of a suitable material such as a hard plastic or a lightweight metal. However, the housing 14 can have a variety of configurations as needed and/or desired. As seen in FIG. 1, the handlebar clamp 16 is detachably coupled to the upper housing part of the housing 14. The handlebar clamp 16 is a conventional tube clamp that constitutes an example of a handlebar mounting member. Here, the handlebar clamp 16 includes a tightening bolt or other tightening member that is configured to squeeze the handlebar clamp 16 onto the handlebar H.

Figure 4:
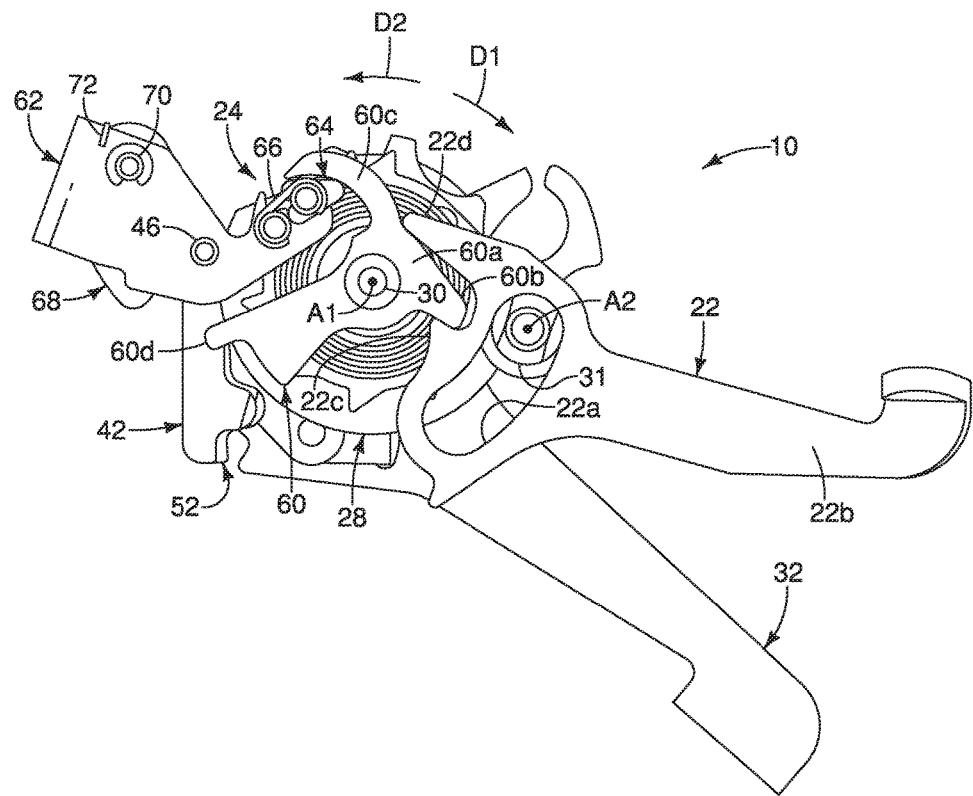
FIG. 4 is a top plan view of selected internal parts of the bicycle operating device illustrated in FIGS. 1 to 3.
Figure 5:
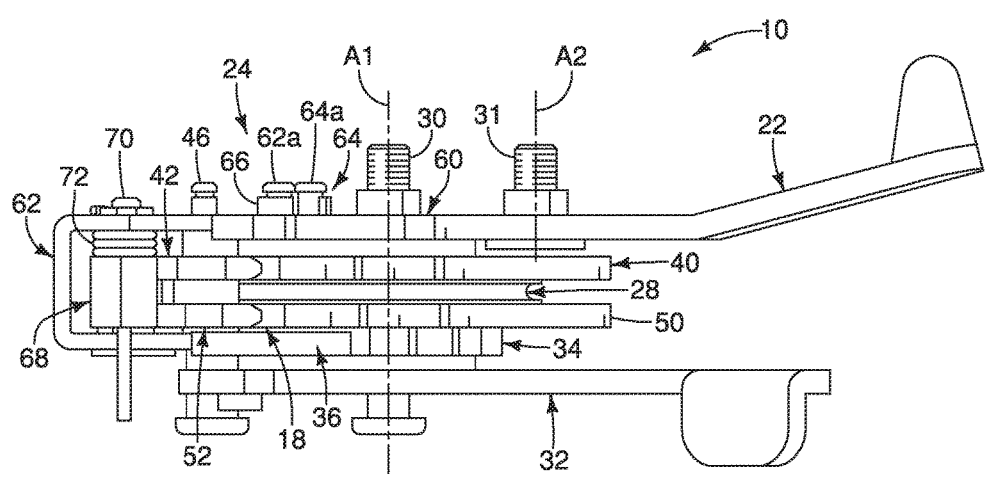
FIG. 5 is a side elevational view of the internal parts of the bicycle operating device illustrated in FIG. 4.
Figure 6:
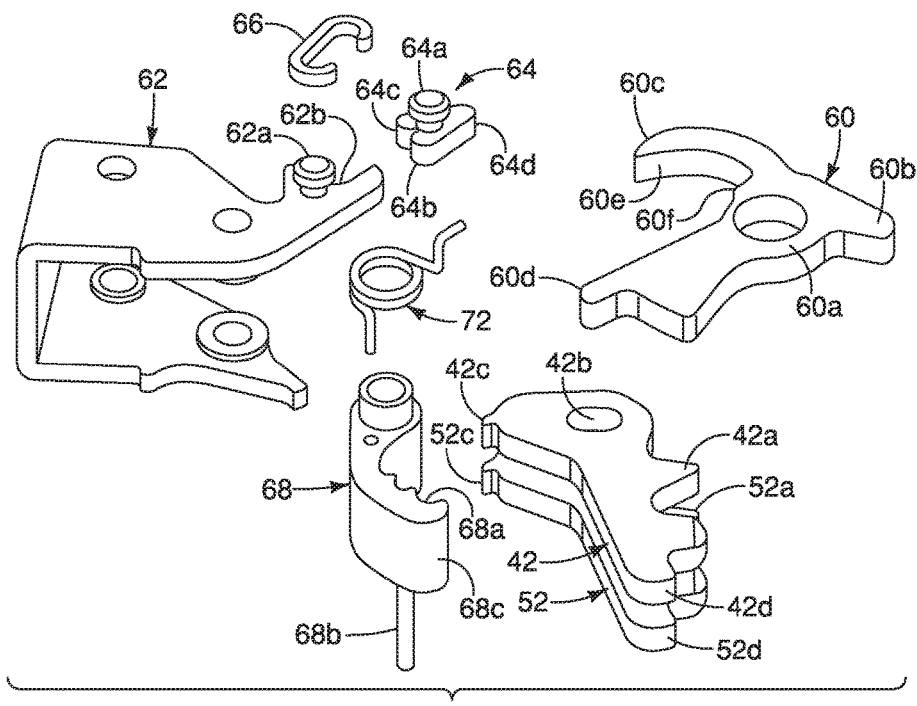
FIG. 6 is a perspective view of selected internal parts of the bicycle operating device illustrated in FIGS. 1 to 5 that form a click mechanism and part of the release mechanism.
Figure 7:
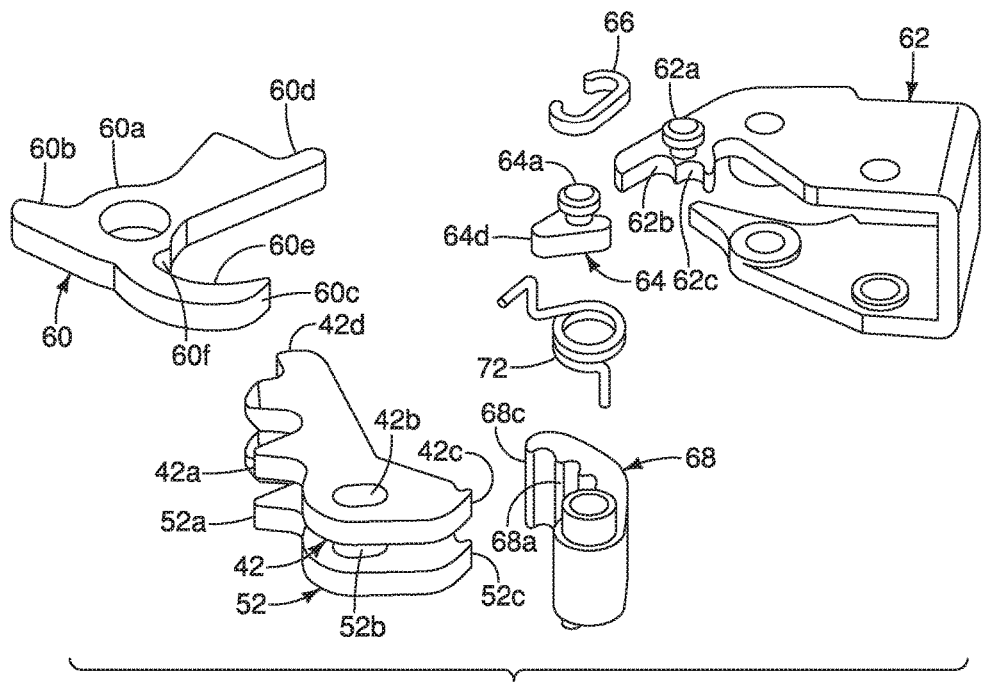
FIG. 7 is another perspective view of the selected internal parts of the bicycle operating device illustrated in FIG. 6 that form a click mechanism and part of the release mechanism.
Figure 8:
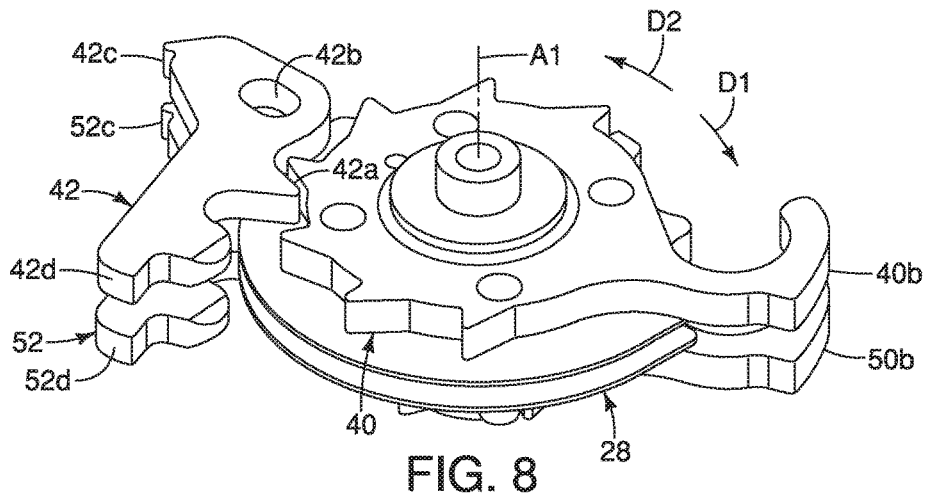
FIG. 8 is a perspective view of selected internal parts of the bicycle operating device illustrated in FIGS. 1 to 5 that form a wire positioning mechanism for a wire take-up member.
Figure 9:
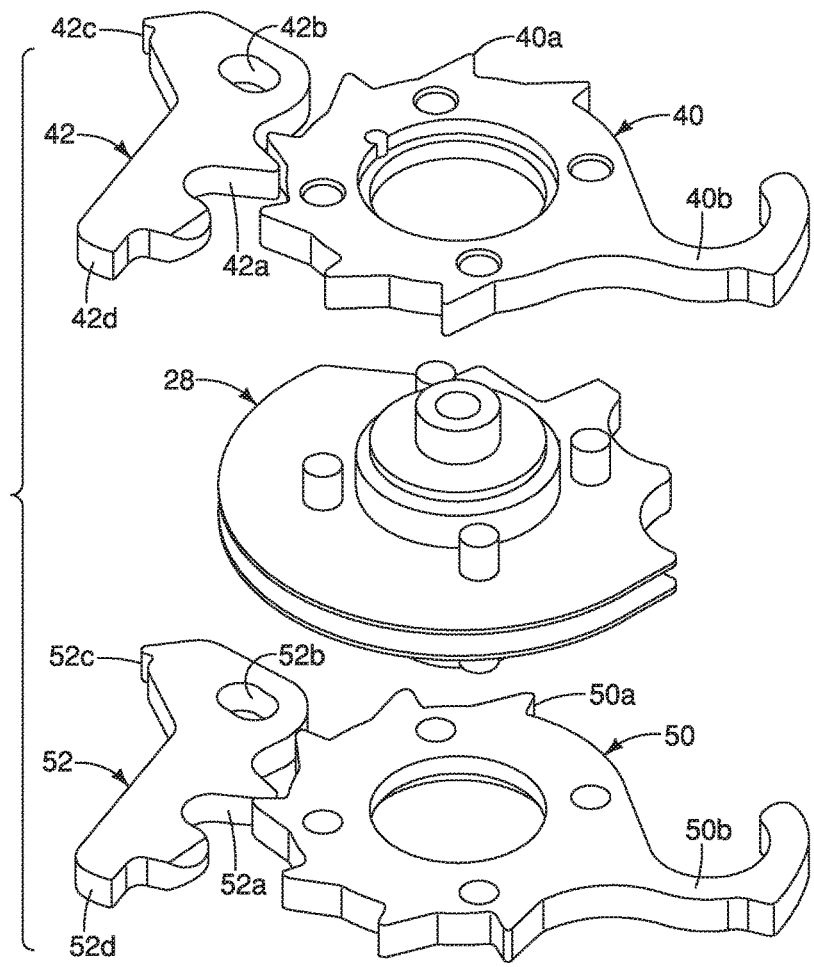
FIG. 9 is an exploded perspective view of the selected internal parts of the bicycle operating device illustrated in FIG. 8 that form a wire positioning mechanism for a wire take-up member.

As seen in FIGS. 2 to 4 and 11, the bicycle operating device 10 comprises an operating member 22 and a click mechanism 24. The operating member 22 is movably arranged between a first position (view (b) of FIG. 11) and a second position (view (c) of FIG. 11). FIGS. 4 and 5 illustrate the operating member 22 in a rest position. The term "rest position" as used herein refers to a state in which the part (e.g., the operating member 22) remains stationary without the need of a user holding the part in that state corresponding to the rest position. As explained later, when the operating member 22 is moved from the first position (view (b) of FIG. 11) to the second position (view (c) of FIG. 11), the click mechanism 24 provides a haptic feedback to the user. In the illustrated embodiment, the operating member 22 is further movably arranged between the second position (view (c) of FIG. 11) and a third position (view (d) of FIG. 11). The click mechanism 24 also provides a haptic feedback to the user when the operating member 22 is moved from the second position (view (c) of FIG. 11) to the third position (view (d) of FIG. 11). The first, second and third positions of the operating member 22 are operated or actuated positions of the operating member 22. The terms "operated position" and "actuated position" as used herein refer to a state in which the part (e.g., the operating member 22) is temporarily held by an external force (e.g., a user holding the part in a state corresponding to the operated position). More specifically, the "operated position" and "actuated position", for example, refers to a state in which the change of the position of the operation cable is completed by the positioning mechanism.

The bicycle operating device 10 further comprises a base member 26 that is movably supporting the operating member 22 and the click mechanism 24. The bicycle operating device 10 further comprises a wire take-up member 28 that is movably arranged in accordance with the operation of the operating member 22. The wire take-up member 28 is rotatably supported by the base member 26 about an operating axis A1. In particular, the wire take-up member 28 is rotatably mounted to the base member 26 by a main axle 30 (e.g., a bolt in the illustrated embodiment). The longitudinal axis of the main axle 30 defines the operating axis A1 of the wire take-up member 28. The inner wire 12b of the control cable 12 is attached to the wire take-up member 28. Rotation of the wire take-up member 28 in a first direction D1 releases the inner wire 12b of the control cable 12 from the housing 14. On the other hand, rotation of the wire take-up member 28 in a second direction D2 pulls the inner wire 12b of the control cable 12 into the housing 14. The first and second directions D1 and D2 are opposite rotational directions with respect to the operating axis A1.

As seen in FIGS. 1 to 4, the operating member 22 constitutes a first operating member or a release member. In other words, the operating member 22 is a release lever that moves the wire take-up member 28 in a releasing direction (the first direction D1) in accordance with the operation of the release lever from the first position (view (b) of FIG. 11) toward the second position (view (c) of FIG. 11). Here, the operating member 22 is in the form of a release lever for releasing the inner wire 12b from the housing 14 as the operating member 22 is moved by the user from a rest position to an actuated position as explained later. Here, the operating member 22 can be operated in either direction with respect to the housing 14 from the rest position to perform a releasing operation as explained later. Of course, alternatively, the operating member 22 can be configured such that the operating member 22 can be pivoted in only one direction to perform a releasing operation. The operating member 22 is movably mounted to the base member 26 by a pin 31 that defines a secondary operating axis A2 of the operating member 22. In particular, the operating member 22 has an arcuate slot 22a that receives the pin 31. The operating member 22 has a user operated portion 22b, a first projection 22c and a second projection 22d, which will be discussed later.

As seen in FIGS. 1 to 4, the bicycle operating device 10 further comprises an operating member 32 that is pivotally supported by the base member 26 about the operating axis A1. The operating member 32 constitutes a second operating member or a pull member. Here, the operating member 32 is in the form of a pull lever for pulling the inner wire 12b into the housing 14 as the operating member 32 is moved by the user from a rest position to an actuated position as explained later. Preferably, the operating member 32 is biased in the first direction D1 to a rest position by a biasing element (not shown) such that the operating member 32 is a trigger lever.

Figure 10:
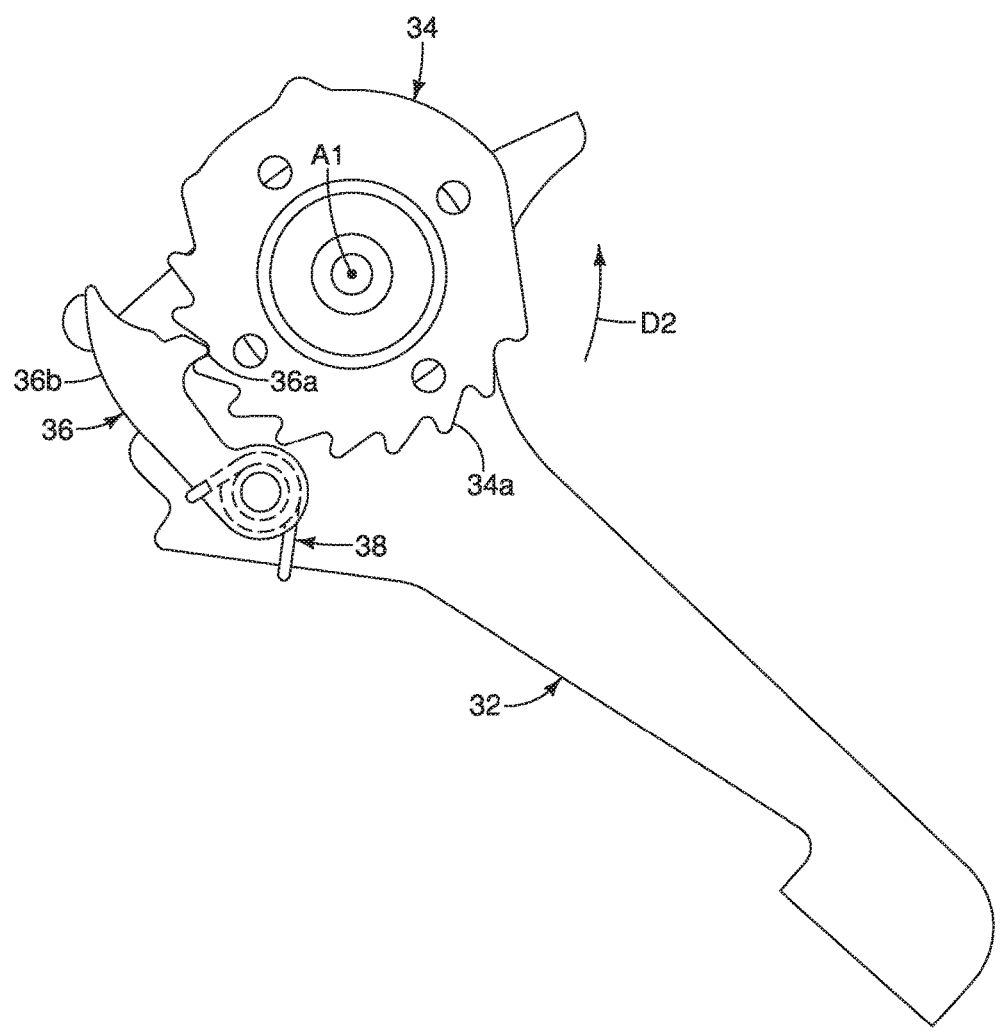
FIG. 10 is a top plan view of selected internal parts of the bicycle operating device illustrated in FIGS. 1 to 5 that form a wire pulling mechanism for the wire take-up member.

As seen in FIG. 10, the bicycle operating device 10 further comprises a pulling ratchet 34 that is fixed to the wire take-up member 28. Thus, the pulling ratchet 34 moves with the wire take-up member 28. The pulling ratchet 34 has a plurality of ratchet teeth 34a. A pulling pawl 36 is pivotally mounted on the operating member 32. The pulling pawl 36 is biased towards the pulling ratchet 34 by a biasing element 38 (e.g., a torsion spring 38). The pulling pawl 36 has a pulling tooth 36a that selectively engages one of the ratchet teeth 34a while the operating member 32 is in a rest position. When the operating member 32 is pivoted about the operating axis A1 in the second direction D2, the wire take-up member 28 is also rotated in the second direction D2. A pulling mechanism is formed by the operating member 32, the pulling ratchet 34 and the pulling pawl 36. The pulling mechanism is relatively conventional, and thus, the pulling mechanism will not be discussed in detail herein. Moreover, in this embodiment, the click mechanism 24 of the bicycle operating device 10 is used with the operating member 22 that is the release lever. However, the click mechanism 24 can be used with pulling mechanisms (pulling lever) as need and/or desired.

Figure 16:
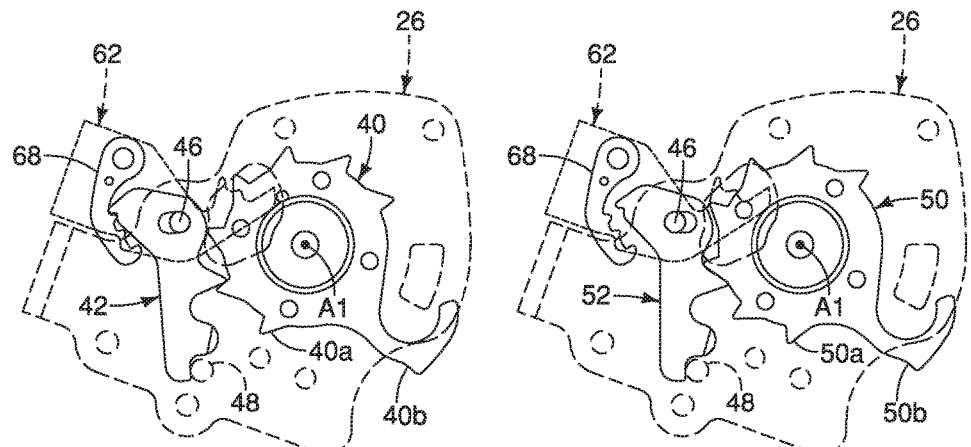
FIG. 16 is a pair of top plan view of selected parts of the wire take-up positioning mechanism for the bicycle operating device illustrated in FIGS. 1 to 5 showing the wire positioning mechanism in the rest position prior to operation of the release lever.
Figure 17:
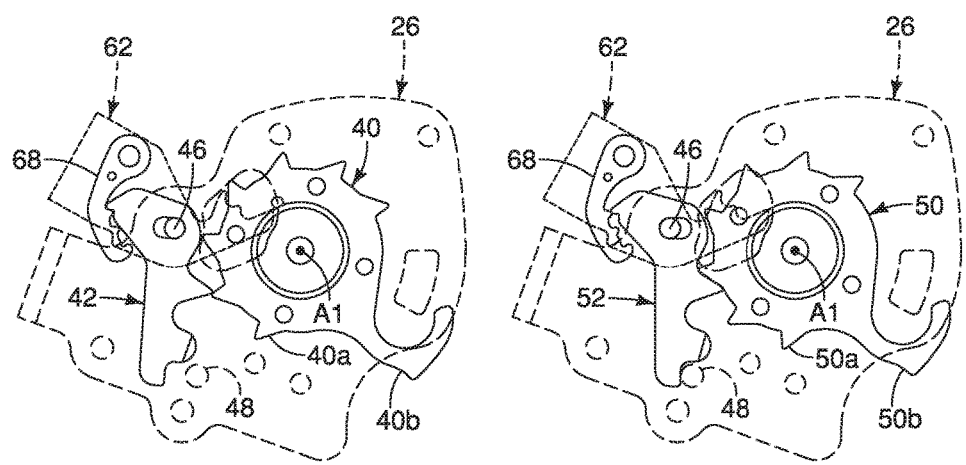
FIG. 17 is a pair of top plan views of the selected parts of the wire positioning mechanism illustrated in FIG. 16, but showing a start of releasing action for the wire positioning mechanism as a result of the release lever (not shown) being moved from the rest position to a partially shifted position.
Figure 18:
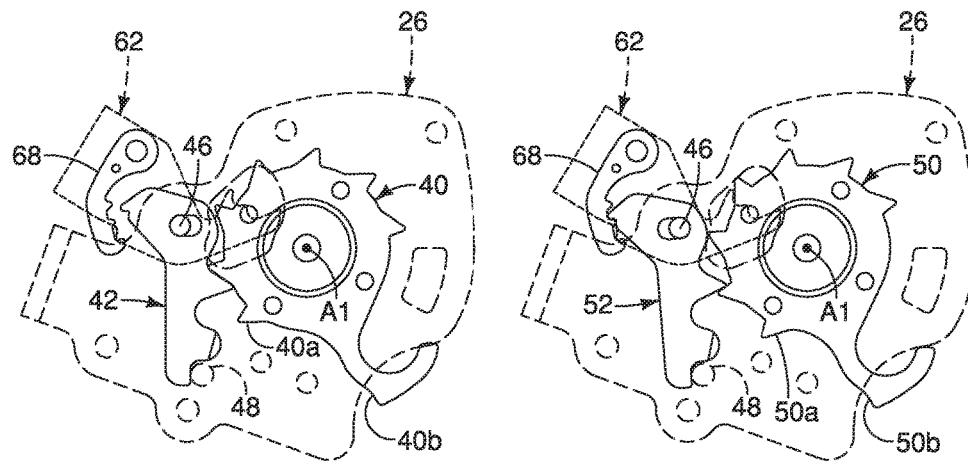
FIG. 18 is a pair of top plan views of the selected parts of the wire positioning mechanism illustrated in FIGS. 16 and 17, but showing the wire positioning mechanism moved to a first shift position as a result of the release lever (not shown) being moved further from the partially shifted position of FIG. 17.
Figure 19:
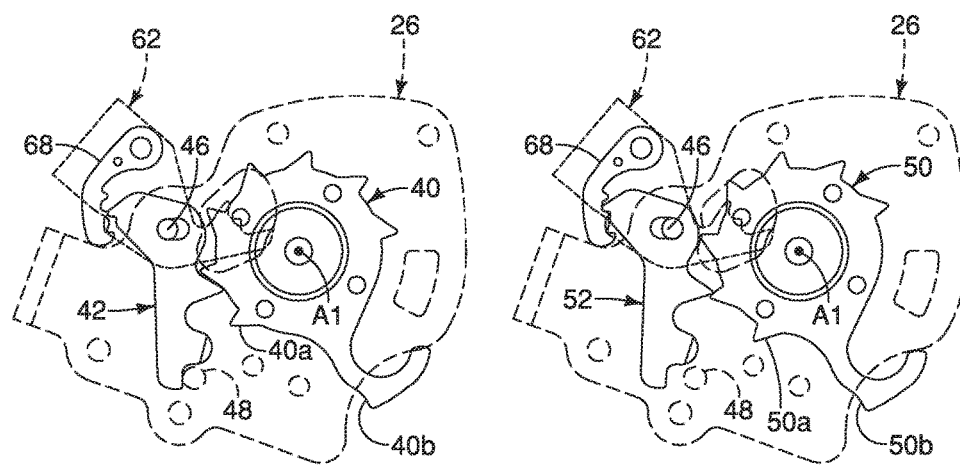
FIG. 19 is a pair of top plan views of the selected parts of the wire positioning mechanism illustrated in FIGS. 16 to 18, but showing the wire positioning mechanism moved to a partially shift position as a result of the release lever (not shown) being moved further from the first shift position of FIG. 18.
Figure 20:
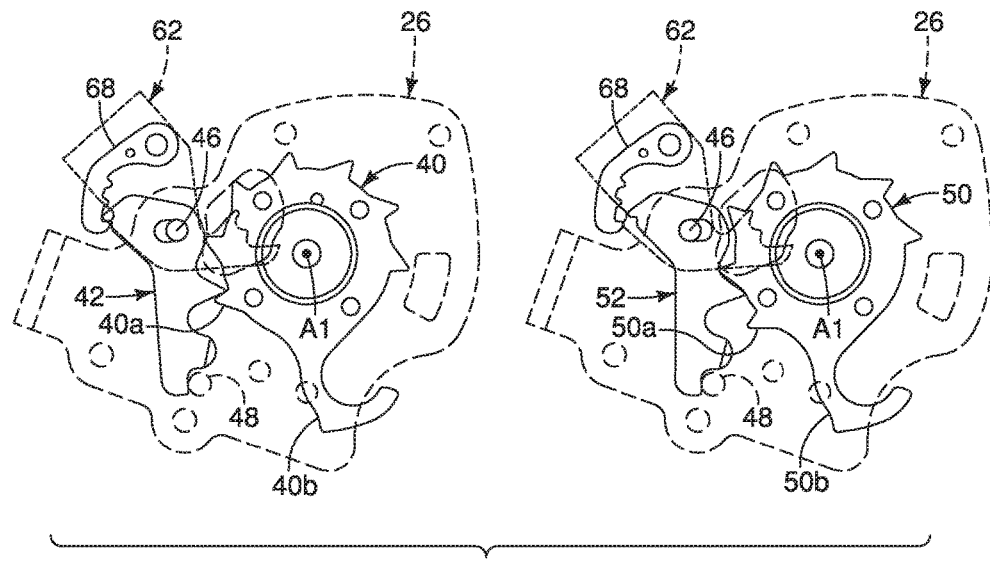
FIG. 20 is a pair of top plan views of the selected parts of the wire positioning mechanism illustrated in FIGS. 16 to 19, but showing the wire positioning mechanism moved to a second shift position as a result of the release lever (not shown) being moved further from the partially shifted position of FIG. 19.
Figure 21:
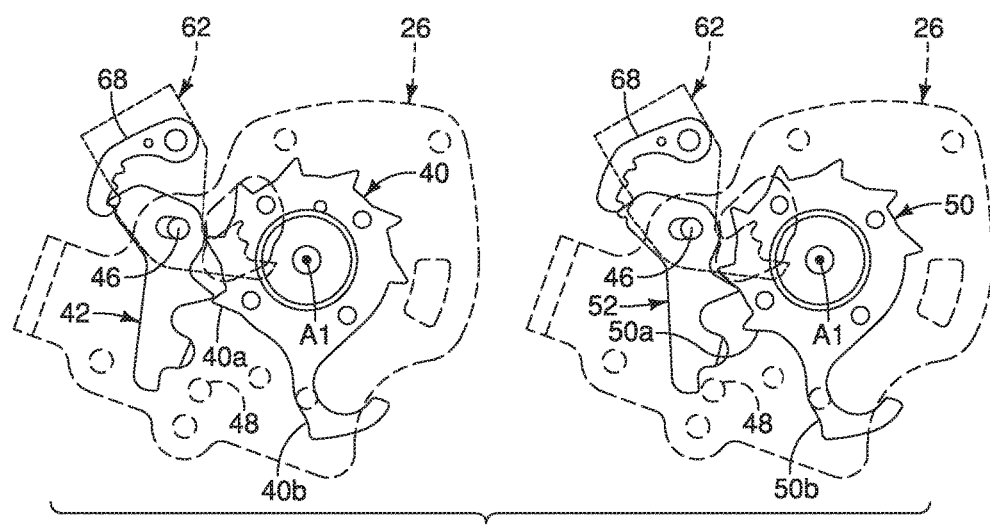
FIG. 21 is a pair of top plan views of the selected parts of the wire positioning mechanism illustrated in FIGS. 16 to 20, but showing the wire positioning mechanism moved to a partially shift position as a result of the release lever (not shown) being moved further from the second shift position of FIG. 20.
Figure 22:
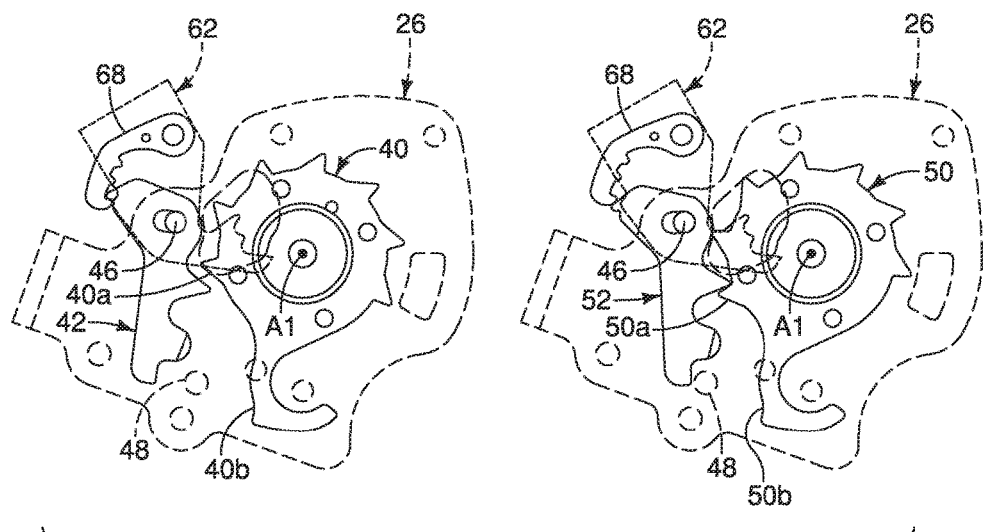
FIG. 22 is a pair of top plan views of the selected parts of the wire positioning mechanism illustrated in FIGS. 16 to 21, but showing the wire positioning mechanism moved to a third shift position as a result of the release lever (not shown) being moved further from the partially shifted position of FIG. 21.
Figure 23:
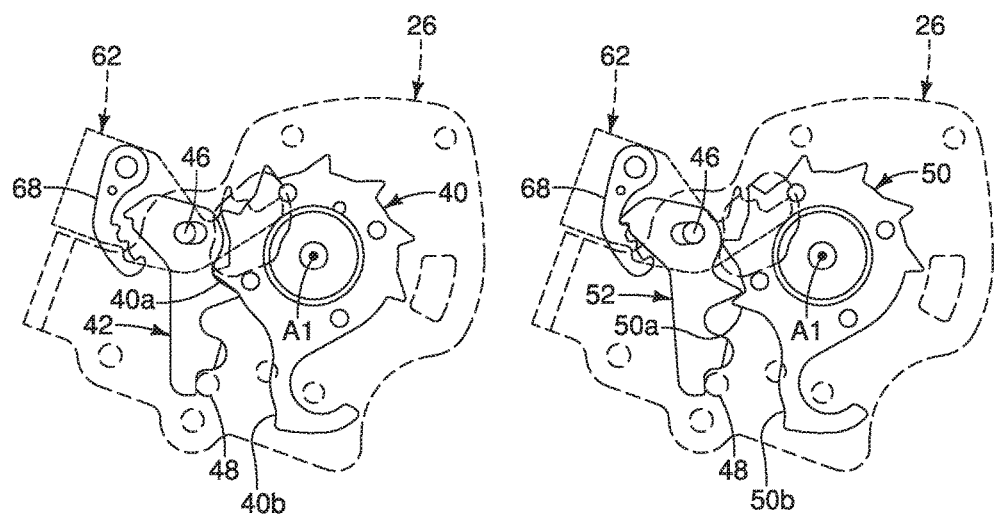
FIG. 23 is a pair of top plan views of the selected parts of the wire positioning mechanism illustrated in FIGS. 16 to 22, but showing the wire positioning mechanism in the third shift position as a result of the release lever (not shown) being returned to the rest position.

The cable position maintaining mechanism 18 of the bicycle operating device 10 further comprises a first positioning ratchet 40 and a first positioning pawl 42. The first positioning ratchet 40 is coupled to the wire take-up member 28. In particular, the first positioning ratchet 40 is fixed to the wire take-up member 28 so that the wire take-up member 28 and the first positioning ratchet 40 are rotatably mounted to rotate together as unit about the operating axis A1. A biasing element 44 (see FIG. 12) is provided between the first positioning ratchet 40 and the base member 26 to bias the wire take-up member 28 and the first positioning ratchet 40 in the first direction D1 about the operating axis A1. As shown in FIGS. 12 to 15, the biasing element 44 can be a flat torsion spring that is coiled around the main axle 30 with a first free end engaged with a hole in the first positioning ratchet 40 and a second end contacting an abutment on the base member 26. The first positioning ratchet 40 has a plurality of first positioning teeth 40a and a cable attachment structure 40b (see FIG. 16).

The first positioning pawl 42 is movably arranged between a holding position and a non-holding position. In particular, the first positioning pawl 42 is pivotally mounted on a pivot shaft 46 that is attached to the base member 26. In the holding position, the first positioning pawl 42 engages one of the first positioning teeth 40a of the first positioning ratchet 40 to hold the wire take-up member 28 and the first positioning ratchet 40 from rotating with respect to the base member 26. In the non-holding position, the first positioning pawl 42 is disengaged from the first positioning teeth 40a of the first positioning ratchet 40 to release the wire take-up member 28 and the first positioning ratchet 40 for rotating with respect to the base member 26. As explained later, the first positioning pawl 42 is biased towards engagement with the first positioning ratchet 40.

The first positioning pawl 42 has a stop tooth 42a that engages one of the first positioning teeth 40a of the first positioning ratchet 40 to hold the wire take-up member 28 while in the holding position. The first positioning pawl 42 has a mounting slot 42b that receives the pivot shaft 46 (see FIG. 16). The mounting slot 42b is elongated so that the first positioning pawl 42 can both pivot and move laterally on the pivot shaft 46. The first positioning pawl 42 further has a first abutment 42c that is hooked during a releasing operation to pivot and/or laterally shift the first positioning pawl 42 with respect to the first positioning ratchet 40. The first positioning pawl 42 also has a second abutment 42d that contacts a stop pin 48 of the base member 26.

Here in the illustrated embodiment, the cable position maintaining mechanism 18 further comprises a second positioning ratchet 50 and a second positioning pawl 52. The second positioning ratchet 50 is coupled to the wire take-up member 28. In particular, the second positioning ratchet 50 is fixed to the wire take-up member 28 on the side opposite to the first positioning ratchet 40. Thus, the first and second positioning ratchets 40 and 50 are both rotatably mounted on the main axle 30 to rotate together with the wire take-up member 28 as unit about the operating axis A1. Since the second positioning ratchet 50 is fixed to the wire take-up member 28, the biasing element 44 biases the second positioning ratchet 50 in the first direction about the operating axis A1. The second positioning ratchet 50 has a plurality of second positioning teeth 50a and a cable attachment structure 50b.

The second positioning pawl 52 is movably arranged between a holding position and a non-holding position. In particular, the second positioning pawl 52 is pivotally mounted on the pivot shaft 46 that is attached to the base member 26. In the holding position, the second positioning pawl 52 engages one of the second positioning teeth 50a of the second positioning ratchet 50 to hold the wire take-up member 28 and the second positioning ratchet 50 from rotating with respect to the base member 26. In the non-holding position, the second positioning pawl 52 is disengaged from the second positioning teeth 50a of the second positioning ratchet 50 to release the wire take-up member 28 and the second positioning ratchet 50 for rotating with respect to the base member 26. As explained later, the second positioning pawl 52 is biased towards engagement with the second positioning ratchet 50.

The second positioning pawl 52 has a stop tooth 52a that engages one of the second positioning teeth 50a of the second positioning ratchet 50 to hold the wire take-up member 28 while in the holding position. The second positioning pawl 52 has a mounting slot 52b that receives the pivot shaft 56. The mounting slot 52b is elongated so that the second positioning pawl 52 can both pivot and move laterally on the pivot shaft 46. The second positioning pawl 52 further has a first abutment 52c that is hooked during a releasing operation to pivot and/or laterally shift the second positioning pawl 52 with respect to the second positioning ratchet 50. The second positioning pawl 52 also has a second abutment 52d that contacts the stop pin 48 of the base member 26.

The second positioning teeth 50a of the second positioning ratchet 50 are angularly offset from the first positioning teeth 40a of the first positioning ratchet 40 with respect to the operating axis A1. In this way, the first and second positioning pawls 42 and 52 alternately engaged with the first and second positioning ratchets 40 and 50 to prevent rotation of the wire take-up member 28. In other words, when the first positioning pawl 42 is engaged with one of the first positioning teeth 40a of the first positioning ratchet 40, the second positioning pawl 52 is not engaged with one of the second positioning teeth 50a of the second positioning ratchet 50. Likewise, when the second positioning pawl 52 is engaged with one of the second positioning teeth 50a of the second positioning ratchet 50, the first positioning pawl 42 is not engaged with one of the first positioning teeth 40a of the first positioning ratchet 40.

Turning now to FIGS. 4 to 7, the click mechanism 24 will now be discussed in more detail. The click mechanism 24 provides the user with an indication that the cable position maintaining mechanism 18 has been operated a predetermined amount during a releasing operation as explained below. In particular, the click mechanism 24 provides a haptic feedback to the user via the operating member 22. Basically, the click mechanism 24 includes an input part 60, an output part 62 and an intermediate part 64. The input part 60 is pivotally arranged in accordance with an operation of the operating member 22. More specifically, the input part 60 is pivotally mounted on the main axle 30. Preferably, the input part 60 is biased to a rest position by a biasing element (not shown) such that the operating member 32 is a trigger lever.

The output part 62 is pivotally arranged with respect to the input part 60 in accordance with the operation of the operating member 22. More specifically, the output part 62 is pivotally mounted to the base member 26 by the pivot shaft 46. The intermediate part 64 is movably arranged between the input and output parts 60 and 62 to transmit movement from the input part 60 to the output part 62. The intermediate part 64 is coupled to the output part 62 by a clip 66. In particular, the clip 66 is disposed on a post 62a of the output part 62 and a post 64a of the intermediate part 64. The clip 66 is constructed of a suitable material that is slightly resilient material (i.e. metal or plastic) and maintains its performed state. In this way, the output part 62 and the intermediate part 64 are retained in contact with each together, but are allowed some relative movement therebetween in response to the operation of the operating member 22.

A release pawl 68 is pivotally mounted on the output part 62 by a pivot pin 70 for moving the first and second positioning pawls 42 and 52 from their holding positions to their non-holding positions in response to the operation of the operating member 22. The release pawl 68 has a plurality of teeth 68a for selectively engaging the first abutments 42c and 52c of the first and second positioning pawls 42 and 52 for disengaging the first and second positioning pawls 42 and 52 from the first and second positioning ratchets 40 and 50, respectively. The release pawl 68 is biased about the pivot pin 70 towards contact with the first and second positioning pawls 42 and 52 by a biasing element 72. The release pawl 68 has a stop member 68b that is biased into contact with the base member 26 to establish a rest position of the release pawl 68. The release pawl 68 has a free end 68c that engages a projection 36b of the pulling pawl 36 to move the pulling pawl 36 out of engagement with the pulling ratchet 34 during a releasing operation. It will be apparent from this disclosure that the click mechanism 24 of the bicycle operating device 10 can be used with other types of releasing mechanisms as need and/or desired. For example, the releasing mechanism of U.S. Pat. No. 7,628,095 can be adapted to be used with the click mechanism 24.

The input part 60 has a central portion 60a, a first projection 60b, a second projection 60c and a third projection 60d. The central portion 60a defines an opening that receives the main axle 30. Preferably, a bushing is provided in the opening of the central portion 60a to allow smooth movement of the input part 60 on the main axle 30. The first projection 60b extends outwardly from the central portion 60a with respect to the operating axis A1. The first projection 60b of the input part 60 engages the first projection 22c of the operating member 22, while the second projection 22d of the operating member 22 engages the central portion 60a of the input part 60. In this way, the operating member 22 is moved away from the handlebar H, the operating member 22 and the input part 60 move together as a single unit about the operating axis A1. However, when the operating member 22 is moved towards the handlebar H, the operating member 22 moves relative to the input part 60 by pivoting on the bolt 31 about the secondary operating axis A2.

Here in the illustrated embodiment, the input part 60 is a separate part from the operating member 22 so that the input part 60 is pivoted about the operating axis A1 in the second direction D2 when the operating member 22 is operated in either direction with respect to the housing 14 from the rest position of FIG. 4. Of course, alternatively, the operating member 22 can be configured such that the operating member 22 can be pivoted in only one direction to perform a releasing operation. In other words, the input part 60 can be integrally formed with the operating member 22 as a single piece if it is desirable for the operating member 22 to be operated only in a single direction.

Figure 11:
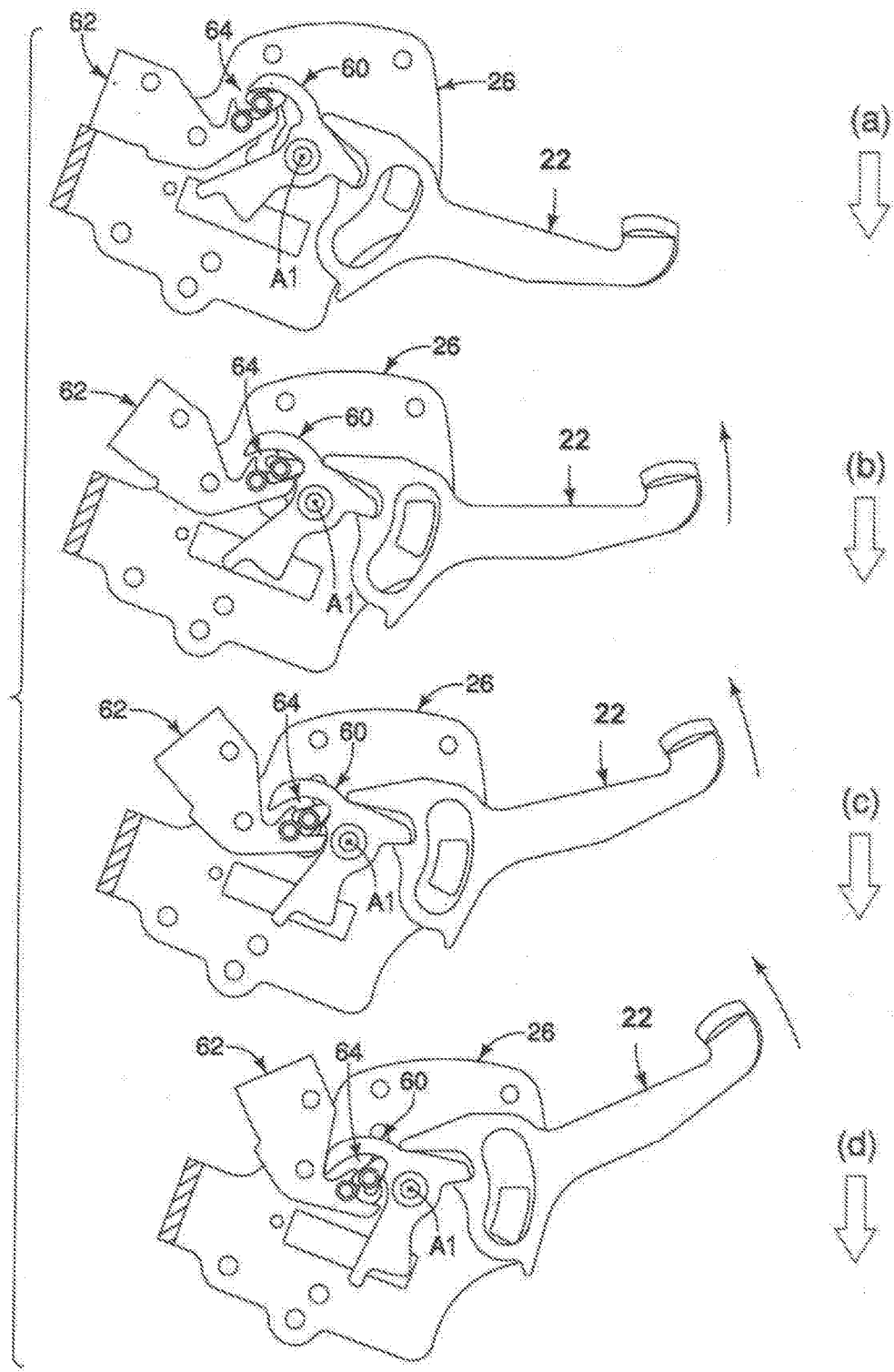
FIG. 11 is a series of top plan views of selected internal parts of the bicycle operating device illustrated in FIGS. 1 to 5 showing operation of the click mechanism during a releasing operation.

The second projection 60c of the input part 60 includes a sliding surface 60e that contacts the intermediate part 64. More specifically, as seen in FIG. 11, the intermediate part 64 contacts the sliding surface 60e and slides along the sliding surface 60e as the operating member 22 moves from the rest position (views (a) of FIG. 11 and FIG. 12) toward the first position (views (b) of FIG. 11 and FIG. 13). The first position (views (b) of FIG. 11) is arranged between the rest position (views (a) of FIG. 11) and the second position (views (c) of FIG. 11 and FIG. 14).

The central portion 60a of the input part 60 includes an abutment surface 60f. The abutment surface 60f is located at inner end of the sliding surface 60e with respect to the operating axis A1. The intermediate part 64 contacts the abutment surface 60f after the intermediate part 64 slides along the sliding surface 60e during movement of the operating member 22 from the rest position (views (a) of FIG. 11 and FIG. 12) toward the first position (views (b) of FIG. 11 and FIG. 13). The intermediate part 64 pivots on the abutment surface 60f as the operating member 22 moves from the first position (view (b) of FIG. 11) toward the second position (views (c) of FIG. 11 and FIG. 14).

The intermediate part 64 includes a first curved protrusion 64b, a second curved protrusion 64c and a third curved protrusion 64d. The third curved protrusion 64d is configured to slide along the sliding surface 60e of the input part 60. On the other hand, the first curved protrusion 64b and the second curved protrusion 64c are configured to contact the output part 62 as explained below. The intermediate part 64 is pivotally disposed about a first pivot axis P1 as the operating member 22 moves from the first position (views (b) of FIG. 11 and FIG. 13) toward the second position (views (c) of FIG. 11 and FIG. 14). The first pivot axis P1 moves relative to the base member 26 as the operating member 22 moves from the first position toward the second position.

Figure 13:
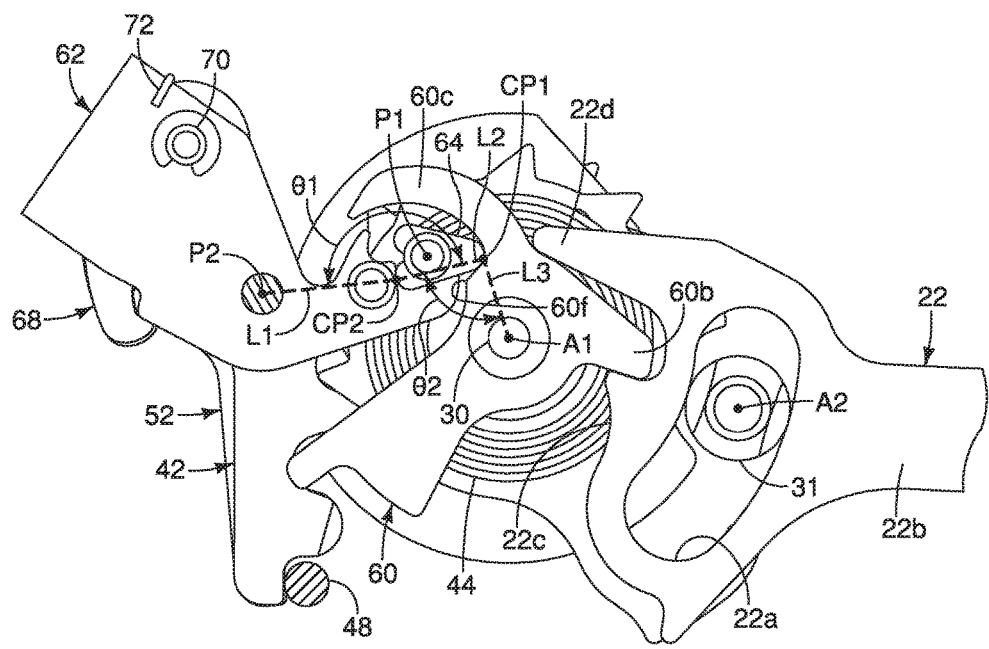
FIG. 13 is a top plan view of selected internal parts of the bicycle operating device illustrated in FIGS. 1 to 5 showing the release lever and the click mechanism in a first position that corresponds to step (b) of FIG. 11.

The intermediate part 64 is configured to contact the input part 60 at a first contact point CP1 in a state where the operating member 22 is in the first position (views (b) of FIG. 11 and FIG. 13). The intermediate part 64 is configured to contact the output part 62 at a second contact point CP2 in the state where the operating member 22 is in the first position (views (b) of FIG. 11 and FIG. 13). The intermediate part 64 and the output part 62 define a first angle θ1 that decreases as the operating member 22 moves from the first position (views (b) of FIG. 11 and FIG. 13) toward the second position (views (c) of FIG. 11 and FIG. 14). The first angle θ1 has an apex at the second contact point CP2, a first leg L1 extending from the second contact point CP2 to a center of the pivot of the output part 62 and a second leg L2 extending from the second contact point CP2 to the first contact point CP1. The first angle θ1 is less than or equal to 180 degrees in a state where the operating member 22 is in the first position (views (b) of FIG. 11 and FIG. 13).

The first contact point CP1 is defined as a center point of a contact surface of the third curved protrusion 64d of the intermediate part 64, which contacts the sliding surface 60e of the input part 60. The second contact point CP2 is defined as a center point of a contact surface of the first curved protrusion 64b of the intermediate part 64, which contacts the first curved recessed surface 62b of the output part 62. The first leg L1 is defined by an imaginary line connecting the second contact point CP2 to a center of the pivot of the output part 62. The center of the pivot of the output part 62 is the longitudinal center axis of the pivot shaft 46. The second leg L2 is defined by an imaginary line connecting the second contact point CP2 to the first contact point CP1.

The intermediate part 64 is movably arranged with respect to the input part 60 and the output part 62 to define a second angle θ2 that decreases as the operating member 22 moves from the first position toward the second position. The second angle θ2 has an apex at the first contact point CP1, the second leg L2 and a third leg L3 extending from the first contact point CP1 to a center of the pivot (the operating axis A1) of the input part 60. The second angle θ2 is less than or equal to 180 degrees in a state where the operating member 22 is in the first position (views (b) of FIG. 11 and FIG. 13). The third leg L3 is defined by an imaginary line connecting the first contact point CP1 to the center of the pivot of the input part 60. The center of the pivot of the input part 60 is the longitudinal center axis of the main shaft 30. Thus, the center of the pivot of the input part 60 is also the operating axis A1 of the operating members 22 and 32.

The output part 62 includes a first curved recessed surface 62b and a second curved recessed surface 62c. The first curved protrusion 64b contacts the first curved recessed surface 62b while the intermediate part 64 slides along the sliding surface 60e during movement of the operating member 22 from the rest position (views (a) of FIG. 11 and FIG. 12) to the first position (views (b) of FIG. 11 and FIG. 13). The second curved protrusion 64c contacts the second curved recessed surface 62c after the intermediate part 64 pivots on the abutment surface 60f as the operating member 22 moves from the first position (views (b) of FIG. 11 and FIG. 13) toward the second position (views (c) of FIG. 11 and FIG. 14). The output part 62 is pivotally disposed about a second pivot axis P2 as the operating member 22 moves from the first position (views (b) of FIG. 11 and FIG. 13) toward the second position (views (c) of FIG. 11 and FIG. 14). The first pivot axis P1 rotates about the second pivot axis P2 as the operating member 22 moves from the first position (views (b) of FIG. 11 and FIG. 13) toward the second position (views (c) of FIG. 11 and FIG. 14).

Figure 12:
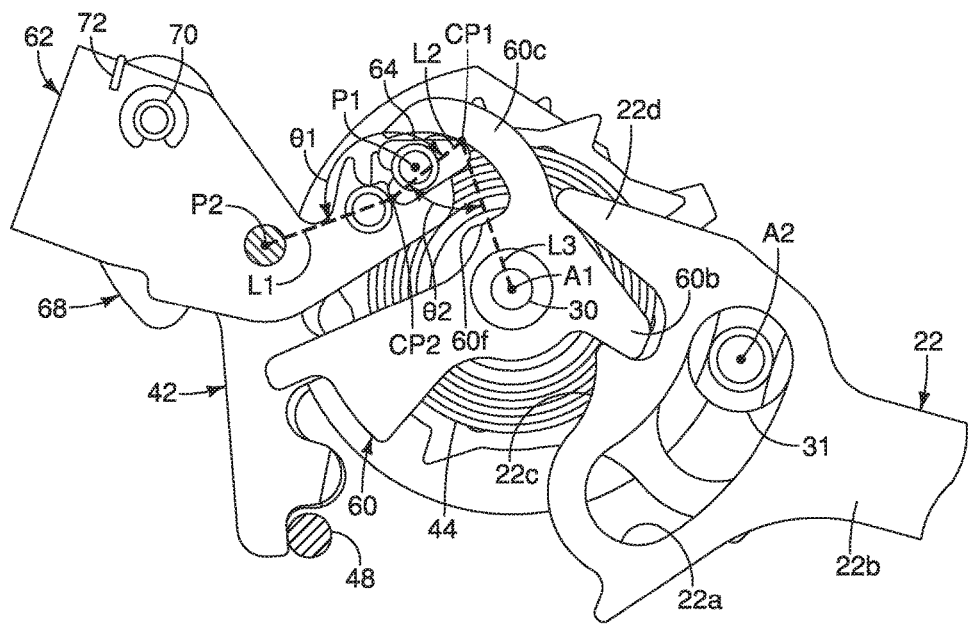
FIG. 12 is a top plan view of selected internal parts of the bicycle operating device illustrated in FIGS. 1 to 5 showing the release lever and the click mechanism in a rest position that corresponds to step (a) of FIG. 11.

As seen in FIGS. 11 to 13 and 16 to 18, the output part 62 moves the first positioning pawl 42 from the holding position to the non-holding position as the intermediate part 64 slides during movement of the operating member 22 from the rest position (views (a) of FIG. 11 and FIG. 12) toward the first position (views (b) of FIG. 11 and FIG. 13). Also the output part 62 moves the first positioning pawl 42 between the holding position and the non-holding position in accordance with the operation of the operating member 22 from the first position (views (b) of FIG. 11 and FIG. 13) toward the second position (views (c) of FIG. 11 and FIG. 14). The first curved protrusion 64b contacts the first curved recessed surface 62b while the intermediate part 64 slides along the sliding surface 60e during movement of the operating member 22 from the rest position to the first position.

Figure 14:
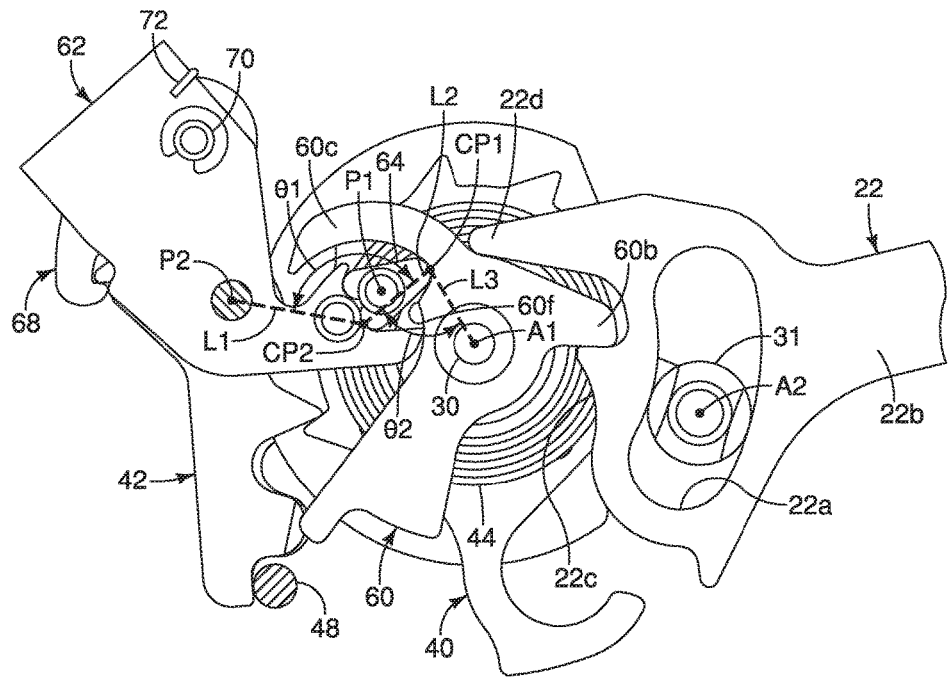
FIG. 14 is a top plan view of selected internal parts of the bicycle operating device illustrated in FIGS. 1 to 5 showing the release lever and the click mechanism in a second position that corresponds to step (c) of FIG. 11.
Figure 15:
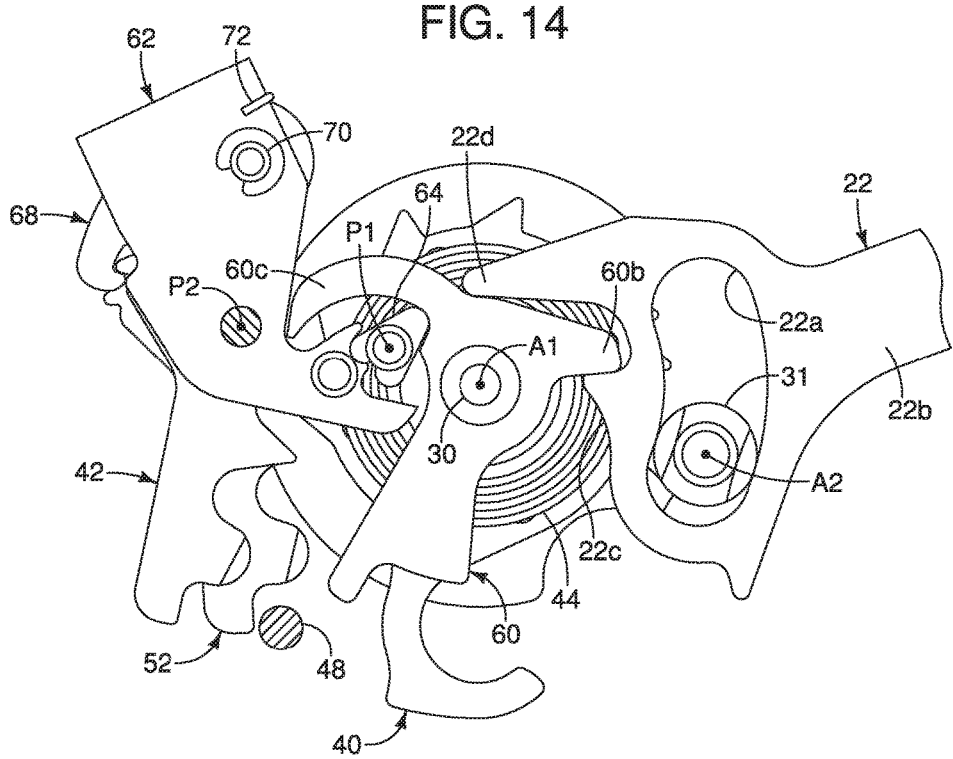
FIG. 15 is a top plan view of selected internal parts of the bicycle operating device illustrated in FIGS. 1 to 5 showing the release lever and the click mechanism in a third position that corresponds to step (c) of FIG. 11.

As seen in FIGS. 11, 13, 14 and 18 to 20, the output part 62 moves the first positioning pawl 42 from the holding position to the non-holding position as the intermediate part 64 pivots on the abutment surface 60f during movement of the operating member 22 from the first position (views (b) of FIG. 11 and FIG. 13) toward the second position (views (c) of FIG. 11 and FIG. 14). As seen in FIG. 14, the second curved protrusion 64c contacts the second curved recessed surface 62c after the intermediate part 64 pivots on the abutment surface 60f as the operating member 22 moves from the first position toward the second position. Also as seen in FIGS. 12 and 13, the output part 62 moves the first positioning pawl 42 from the holding position to the non-holding position as the intermediate part 64 pivots on the abutment surface 60f from a position in which only the first curved protrusion 64b contacts the first curved recessed surface 62b to a position in which the first and second curved protrusions 64b and 64c contact the first and second curved recessed surfaces 62b and 62c, respectively.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle operating device. Accordingly, these directional terms, as utilized to describe the bicycle operating device should be interpreted relative to a bicycle in an upright riding position on a horizontal surface and that is equipped with the bicycle operating device. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle operating device comprising:
   an operating member movably arranged between a first position and a second position; and
   a click mechanism including:
      an input part pivotally arranged in accordance with an operation of the operating member,
      an output part pivotally arranged with respect to the input part in accordance with the operation of the operating member, and
      an intermediate part movably arranged between the input part and the output part at to transmit movement from the input part to the output part, the intermediate part being a separate member from the output part, the intermediate part being configured to contact the input part at a first contact point in a state where the operating member is in the first position, the intermediate part being configured to contact the output part at a second contact point in the state where the operating member is in the first position, the intermediate part and the output part defining a first angle that decreases as the operating member moves from the first position toward the second position, the first angle having an apex at the second contact point, a first leg extending from the second contact point to a center of the pivot of the output part and a second leg extending from the second contact point to the first contact point, the first angle being less than or equal to 180 degree in a state where the operating member is in the first position.

2. The bicycle operating device according to claim 1, wherein
   the input part includes a sliding surface, the intermediate part contacts the sliding surface and slides along the sliding surface as the operating member moves from a rest position toward the first position, the first position being arranged between the rest position and the second position.

3. The bicycle operating device according to claim 1, further comprising
a base member movably supporting the operating member and the click mechanism, wherein
the intermediate part is pivotally disposed about a first pivot axis as the operating member moves from the first position toward the second position, and the first pivot axis moves relative to the base member as the operating member moves from the first position toward the second position.

4. The bicycle operating device according to claim 3, wherein
the output part is pivotally disposed about a second pivot axis as the operating member moves from the first position toward the second position, and the first pivot axis rotates about the second pivot axis as the operating member moves from the first position toward the second position.

5. The bicycle operating device according to claim 1, further comprising
a wire take-up member movably arranged in accordance with the operation of the operating member.

6. The bicycle operating device according to claim 5, further comprising
a positioning ratchet coupled to the wire take-up member, and
a positioning pawl movably arranged between a holding position and a non-holding position.

7. The bicycle operating device according to claim 6, wherein
the operating member is a release lever that moves the wire take-up member in a releasing direction in accordance with the operation of the release lever from the first position toward the second position.

8. A bicycle operating device comprising:
an operating member movably arranged between a first position and a second position; and
a click mechanism including:
an input part pivotally arranged in accordance with an operation of the operating member,
an output part pivotally arranged with respect to the input part in accordance with the operation of the operating member, and
an intermediate part movably arranged between the input part and the output part to transmit movement from the input part to the output part, the intermediate part being configured to contact the input part at a first contact point in a state where the operating member is in the first position, the intermediate part being configured to contact the output part at a second contact point in the state where the operating member is in the first position, the intermediate part and the output part defining a first angle that decreases as the operating member moves from the first position toward the second position, the first angle having an apex at the second contact point, a first leg extending from the second contact point to a center of the pivot of the output part and a second leg extending from the second contact point to the first contact point, the first angle being less than or equal to 180 degree in a state where the operating member is in the first position,
the intermediate part being movably arranged with respect to the input part and the output part to define a second angle that decreases as the operating member moves from the first position toward the second position, the second angle having an apex at the first contact point, the second leg and a third leg extending from the first contact point to a center of the pivot of the input part, the second angle being less than or equal to 180 degree in a state where the operating member is in the first position.

9. A bicycle operating device comprising:
an operating member movably arranged between a first position and a second position; and
a click mechanism including:
an input part pivotally arranged in accordance with an operation of the operating member,
an output part pivotally arranged with respect to the input part in accordance with the operation of the operating member, and
an intermediate part movably arranged between the input part and the output part to transmit movement from the input part to the output part, the intermediate part being configured to contact the input part at a first contact point in a state where the operating member is in the first position, the intermediate part being configured to contact the output part at a second contact point in the state where the operating member is in the first position, the intermediate part and the output part defining a first angle that decreases as the operating member moves from the first position toward the second position, the first angle having an apex at the second contact point, a first leg extending from the second contact point to a center of the pivot of the output part and a second leg extending from the second contact point to the first contact point, the first angle being less than or equal to 180 degree in a state where the operating member is in the first position,
the input part including a sliding surface, the intermediate part contacting the sliding surface and sliding along the sliding surface as the operating member moves from a rest position toward the first position, the first position being arranged between the rest position and the second position, and
the input part including an abutment surface, the intermediate part contacting the abutment surface after the intermediate part slides along the sliding surface during movement of the operating member from the rest position toward the first position, and the intermediate part pivoting on the abutment surface as the operating member moves from the first position toward the second position.

10. The bicycle operating device according to claim 9, wherein
the output part includes a first curved recessed surface, and
the intermediate part includes a first curved protrusion, the first curved protrusion contacting the first curved recessed surface while the intermediate part slides along the sliding surface during movement of the operating member from the rest position to the first position.

11. The bicycle operating device according to claim 10, wherein
the output part includes a second curved recessed surface, and
the intermediate part includes a second curved protrusion, the second curved protrusion contacting the second curved recessed surface after the intermediate part pivots on the abutment surface as the operating member moves from the first position toward the second position.

12. A bicycle operating device comprising:
an operating member movably arranged between a first position and a second position;
a wire take-up member movably arranged in accordance with the operation of the operating member;
a positioning ratchet coupled to the wire take-up member;
a positioning pawl movably arranged between a holding position and a non-holding position; and
a click mechanism including:
an input part pivotally arranged in accordance with an operation of the operating member,
an output part pivotally arranged with respect to the input part in accordance with the operation of the operating member, and
an intermediate part movably arranged between the input part and the output part to transmit movement from the input part to the output part, the intermediate part being configured to contact the input part at a first contact point in a state where the operating member is in the first position, the intermediate part being configured to contact the output part at a second contact point in the state where the operating member is in the first position, the intermediate part and the output part defining a first angle that decreases as the operating member moves from the first position toward the second position, the first angle having an apex at the second contact point, a first leg extending from the second contact point to a center of the pivot of the output part and a second leg extending from the second contact point to the first contact point, the first angle being less than or equal to 180 degree in a state where the operating member is in the first position,
the output part moving the positioning pawl between the holding position and the non-holding position in accordance with the operation of the operating member from the first position toward the second position.

13. The bicycle operating device according to claim 12, wherein
the input part includes a sliding surface, the intermediate part contacts the sliding surface and slides along the sliding surface as the operating member moves from a rest position toward the first position, the first position being arranged between the rest position and the second position.

14. The bicycle operating device according to claim 13, wherein
the input part includes an abutment surface, the intermediate part contacts the abutment surface after the intermediate part slides along the sliding surface during movement of the operating member from the rest position toward the first position, and the intermediate part pivoting on the abutment surface as the operating member moves from the first position toward the second position.

15. The bicycle operating device according to claim 14, wherein
the output part moves the positioning pawl from the holding position to the non-holding position as the intermediate part pivots on the abutment surface during movement of the operating member from the first position toward the second position.

16. The bicycle operating device according to claim 14, wherein
the output part includes a first curved recessed surface, and
the intermediate part includes a first curved protrusion, the first curved protrusion contacting the first curved recessed surface while the intermediate part slides along the sliding surface during movement of the operating member from the rest position to the first position.

17. The bicycle operating device according to claim 16, wherein
the output part includes a second curved recessed surface, and
the intermediate part includes a second curved protrusion, the second curved protrusion contacting the second curved recessed surface after the intermediate part pivots on the abutment surface as the operating member moves from the first position toward the second position.

18. The bicycle operating device according to claim 17, wherein
the output part moves the positioning pawl from the holding position to the non-holding position as the intermediate part pivots on the abutment surface from a position in which only the first curved protrusion contacts the first curved recessed surface to a position in which the first and second curved protrusions contact the first and second curved recessed surfaces, respectively.

19. The bicycle operating device according to claim 12, wherein
the output part moves the positioning pawl from the holding position to the non-holding position as the intermediate part slides during movement of the operating member from the rest position toward the first position.

* * * * *